US008692465B2

(12) United States Patent
Gerhard et al.

(10) Patent No.: US 8,692,465 B2

(45) Date of Patent: Apr. 8, 2014

(54) APPARATUS FOR FASTENING THE BURNER OF A DISCHARGE LAMP

(75) Inventors: Markus Gerhard, Aachen (DE); Juergen Gerhard Mertens, Aachen (DE)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 13/314,434

(22) Filed: Dec. 8, 2011

(65) Prior Publication Data

US 2012/0206041 A1 Aug. 16, 2012

Related U.S. Application Data

(63) Continuation of application No. PCT/IB2010/054036, filed on Sep. 8, 2010.

(30) Foreign Application Priority Data

Sep. 18, 2009 (EP) .................................... 09170699

(51) Int. Cl.
*B60Q 1/02* (2006.01)

(52) U.S. Cl.
USPC ........................................ 315/82; 313/318.09

(58) Field of Classification Search
USPC ........... 313/318.01–318.12; 315/82; 362/459, 362/475–476, 420, 512, 519, 523, 548–549, 362/191, 198, 217.12–217.17, 249.11, 365, 362/368, 406, 414, 430, 439
See application file for complete search history.

(56) References Cited

U.S. PATENT DOCUMENTS

| | | | | |
|---|---|---|---|---|
| 5,036,439 | A * | 7/1991 | Hoffmann et al. | 362/459 |
| 5,126,619 | A | 6/1992 | Wakimizu | |
| 5,428,261 | A * | 6/1995 | Wittig et al. | 313/318.1 |
| 5,594,295 | A | 1/1997 | Van Gennip | |
| 5,742,114 | A * | 4/1998 | Kohl et al. | 313/318.01 |
| 5,957,569 | A * | 9/1999 | Helbig et al. | 362/263 |
| 6,031,323 | A * | 2/2000 | Behr et al. | 313/318.01 |
| 6,203,169 | B1 * | 3/2001 | Coushaine et al. | 362/652 |
| 6,274,973 | B1 * | 8/2001 | Mochiduki et al. | 313/318.09 |
| 6,894,429 | B2 * | 5/2005 | Tsuda et al. | 313/318.09 |
| 2007/0019423 | A1 * | 1/2007 | Westemeyer et al. | 362/460 |
| 2008/0129205 | A1 * | 6/2008 | Weinert et al. | 315/82 |

FOREIGN PATENT DOCUMENTS

| | | | | |
|---|---|---|---|---|
| DE | 102006058887 A1 | 6/2008 | | |
| EP | 0367343 A2 | 5/1990 | | |
| EP | 0478058 A1 | 4/1992 | | |
| EP | 0639849 A1 | 2/1995 | | |
| WO | 2007096330 A1 | 8/2007 | | |
| WO | 2008110969 A2 | 9/2008 | | |
| WO | WO 2008110969 A2 * | 9/2008 | | H01J 5/60 |
| WO | 2009130654 A1 | 10/2009 | | |

* cited by examiner

*Primary Examiner* — Douglas W Owens
*Assistant Examiner* — Henry Luong

(57) ABSTRACT

An apparatus for fastening a burner of a discharge lamp to a housing or plug portion including a sleeve clamped around an outer bulb of the burner, an annular base fastened to the housing or plug portion of the electronic ballast unit having tabs that are orientated in the direction of the center point of the annular base and are biased against the sleeve. The tabs are inclined at an angle through an opening of the base, so that in the mounted condition of the burner, they rest against the sleeve below a surface of the annular base.

11 Claims, 3 Drawing Sheets

APPARATUS FOR FASTENING THE BURNER OF A DISCHARGE LAMP

The invention relates to an apparatus for fastening the burner of a discharge lamp to a housing or plug portion, comprising a sleeve or clamping bracket that can be clamped around the outer bulb of the burner and an annular base that can be mounted to the housing or plug portion and that includes at least three tabs which are orientated in the direction of the center point of the ring and which can be biased against the sleeve. The invention further relates to a discharge lamp having a burner, the outer bulb of which is provided with a sleeve via which the outer bulb is fastened to a housing or plug portion of an electronic ballast unit by means of an annular base, with tabs integrally formed onto the base being biased against the sleeve and welded thereto.

Apart from the light bulbs that have been in use in the automotive sector for a long time, discharge lamps are increasingly being used for automotive lighting systems due to their substantially improved lighting efficiency compared to bulbs. With known discharge lamps, a gas discharge which emits very intensive light is generated in a closed discharge vessel between two electrodes.

A discharge lamp usually includes a base as well as a burner with a discharge vessel. The base is used for holding the burner and for positioning the lamp in a headlight. In the discharge vessel, the actual light generation takes place. Around the discharge vessel, an outer bulb made of glass is usually located. This is used for filtering out any UV radiation from the emitted light.

The discharge lamp may be connected via the base to a plug in which the ignition electronics is integrated, and the electric connection may be made via the plug by means of an externally located ballast unit. Alternatively, the discharge lamp may be connected via the base directly to the housing of an electronic ballast unit. To this end, the base is mounted on the housing in such a way that its circular opening corresponds to a recess in the housing, so that in the mounted condition, the outer bulb of the discharge lamp as well as the return wire protrude into the housing of the electronic ballast unit. Generally, the base is circular or round in shape to facilitate attaching the base to the housing or plug. However, any suitable geometry can be chosen for the base, and any reference in the following to an ‘annular’ form of the base should be understood to mean that the base surrounds the burner without necessarily being circular. The burner is usually fastened in the base by means of spring tabs integrally mounted on the base, which rest above the base against a metal sleeve clamped around the outer bulb of the burner in a biased condition and are fixed thereto by spot welding upon adjustment of the burner in the base.

The geometry of the burner disposed on the housing or plug portion is predetermined and is used as the basis for designing the reflector or headlamp in which the discharge lamp is to be used. An essential parameter here is the distance between the base surface and the center of the burner (LCL=Light Centre Length).

In the context of continuously increasing requirements in the automotive industry with regard to reducing the installation space of a headlamp, it is an object of the present invention to provide an apparatus and method for fastening the burner of a discharge lamp to a housing or plug portion, which allows the LCL to be reduced in order to minimize the required installation space for a headlamp.

According to the invention, the apparatus for fastening the burner of a discharge lamp to a housing or plug portion, comprising a sleeve to be clamped around the outer bulb of the burner and an annular, preferably circular, base which can be fastened to the housing or plug portion of an electronic ballast unit and which has at least three tabs that are orientated in the direction of the center point of the annular base and may be biased against the sleeve, characterized in that the tabs are inclined at an angle through an opening of the annular base, so that, in the mounted condition of the burner, they rest against the sleeve below a surface of the annular base.

The object of the invention is achieved by means of the fact that the tabs extend through the annular opening of the base at an angle in such a way that they rest against the sleeve below the surface of the base in the mounted condition of the burner. Such tabs are usually realized as spring tabs to achieve a spring-bias against the sleeve, and may therefore simply be referred to as ‘spring tabs’ in the following.

By means of the invention, an apparatus for fastening the burner of a discharge lamp to a housing or plug portion is provided, which allows the LCL to be reduced. Due to the inclination of the spring tabs through the annular opening of the base, the fastening point on the sleeve clamped around the outer bulb of the burner is displaced in the direction of the housing below the surface of the base, which results in a reduction of the LCL by approx. 10 mm. This reduction of the LCL has an immediate effect on the required installation space for the reflector and the headlight.

According to the invention, the method of fastening the burner of a discharge lamp to a housing or plug portion of an electronic ballast unit comprises the steps of clamping a sleeve around an outer bulb of the burner; and fastening the burner in a base, which base can be fastened to the housing or plug portion, by means of at least three spring tabs arranged on the base in the direction of a center point of the base, such that the spring tabs are inclined at an angle through an opening of the base and may be biased against the sleeve so that, in the mounted condition of the burner, they rest against the sleeve below a surface of the base.

In a further development of the invention, the base has a rim around its perimeter, in which recesses, preferably holes or through-openings, are formed which are located on a straight line defined by a center point of the base and a point in the area of a spring tab, which in the mounted condition rests against the sleeve of the discharge lamp. This allows the spring tabs to be spot welded to the sleeve by laser welding at that fastening point. To this end, the sleeve and/or the spring tabs and/or the base are preferably made from a steel material.

The object is further achieved by a discharge lamp wherein the spring tabs are bent through the annular opening of the base and rest against the sleeve below the surface of the adjustment ring.

In a further development of the invention, the outer bulb of the burner is fastened to the housing of an electronic ballast unit and is provided with a high voltage insulation layer within the housing of the electronic ballast unit. This enables a shorter implementation of the outer bulb to be achieved, so that the outer bulb which protrudes into the housing of the electronic ballast unit may be reduced, which in turn allows the depth of the housing of the electronic ballast unit to be reduced.

The fastening point at which a spring tab is attached to the sleeve is, according to the invention, below the upper surface of the base. To attach a spring tab to the sleeve, it may be necessary to access the fastening point from below. Therefore, in a further preferred embodiment of the invention, a spring tab comprises a tab opening arranged at least in a region of the spring tab between the base and the sleeve. Such a tab opening allows access from above, so that the spring tab can be easily and quickly attached to the sleeve. The tab opening could comprise a cut-away portion of the spring tab, for example a rectangular or semi-circular area punched out of one side of the spring tab. Alternatively, the tab opening could comprise a slot or hole in the spring tab punched out of the region of the spring tab between the base and the sleeve. Such a slot or longitudinal hole may allow a favorably rigid realization of the spring tab while allowing access from above to the fastening point. A further advantage of such a tab opening is that the spring tab can be manufactured using less material.

A spring tab can be fastened to the sleeve using any suitable technique. For example, the spring tabs, which are fastened to the base, could be glued to the sleeve, which is firmly attached to the outer bulb of the burner. In this way, the burner can be satisfactorily held in place in the housing or plug portion. However, applying glue might be an awkward and time-consuming process, and may require an additional curing step. Therefore, in a particularly preferred embodiment of the invention, the method of fastening the burner to the housing comprises the step directing a beam of laser light at a fastening point or 'weld point' of a spring tab to laser-weld the spring tab to the sleeve.

In one embodiment of the invention, the base comprises at least one opening or hole in its perimeter, which opening or hole lies on a straight line defined by the center point of the base and a point in the fastening point or weld point of a spring tab, and the method preferably comprises the step of directing a beam of laser light through the opening at the fastening point of the spring tab to weld the spring tab to the sleeve.

Therefore, in a particularly preferred embodiment, a spring tab comprises a tab opening in a region of the spring tab between the base and the sleeve, and the method according to the invention comprises the step of directing a beam of laser light from above the base and through the tab opening at the fastening point of the spring tab to weld the spring tab to the sleeve. The use of spring tabs with tab openings as described has the advantage that holes need not be formed in the base. Furthermore, the fastening point can easily be made longer in a vertical direction if desired by adjusting the vertical angle of the laser. If the tab opening simply comprises a cut-out on one side of the spring tab, the fastening point can easily be made wider if desired by adjusting the horizontal angle of the laser.

Other further developments and embodiments of the invention are set out in the dependent claims. Embodiment examples of the invention are illustrated in the drawings and will be described in detail below, wherein:

Figure 1:
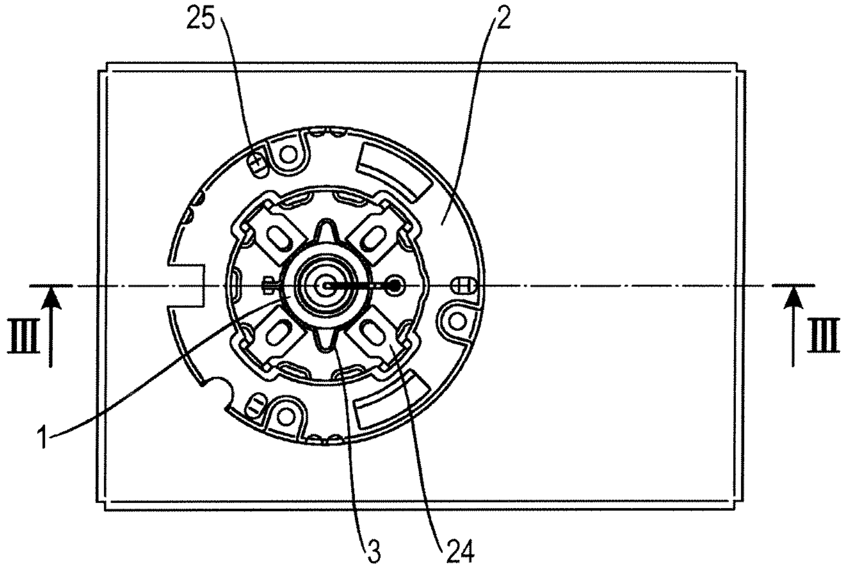
FIG. 1 shows a schematic diagram of a discharge lamp having a burner fastened to the housing of an electronic ballast unit in a top view.
Figure 2:
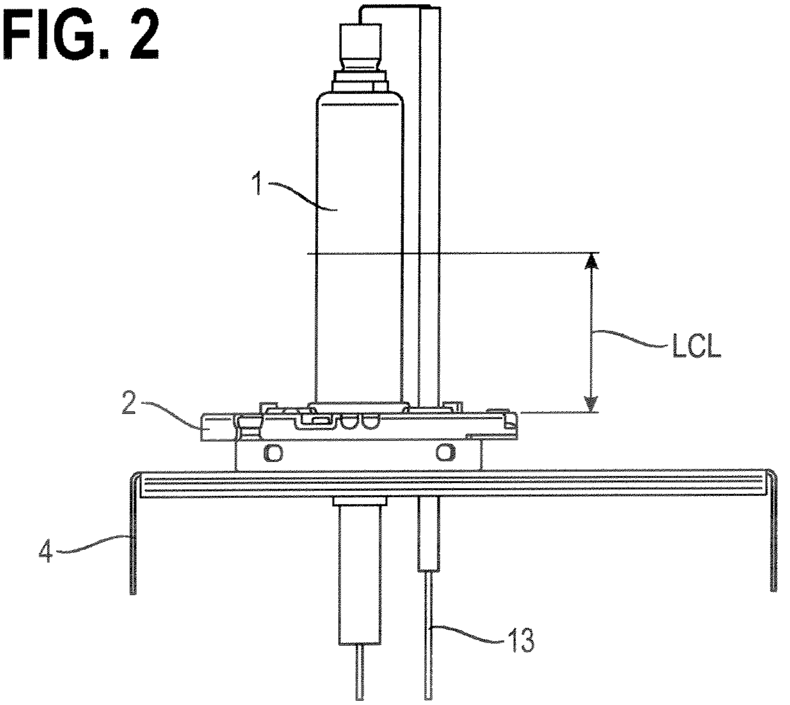
FIG. 2 shows the schematic diagram of the discharge lamp of FIG. 1 in a lateral view.
Figure 3:
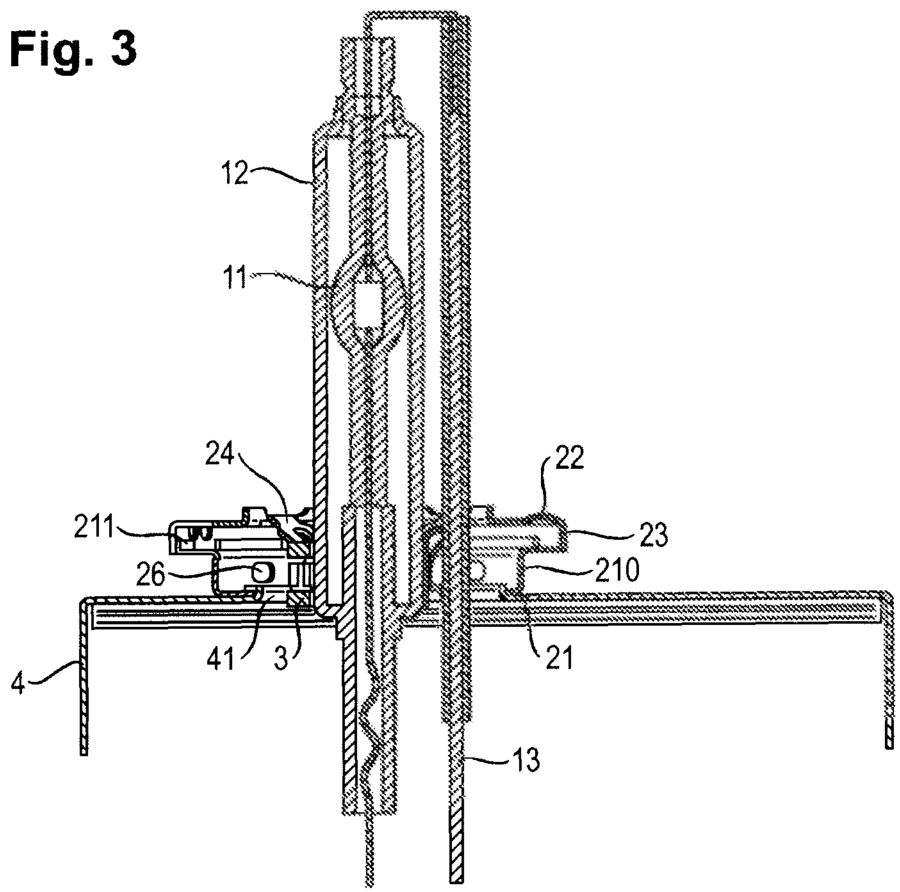
FIG. 3 shows the schematic diagram of the discharge lamp of FIG. 1 along the section III-III.

The discharge lamp selected as an embodiment example in FIG. 1 (top view), FIG. 2 (side view) and FIG. 3 (cross-section) comprises a burner 1 with a discharge vessel 11 which is surrounded by an outer bulb 12 and which is connected to the housing 4 of an electronic ballast unit via a base 2. On its end facing the housing 4, the outer bulb 12 of the burner 1 is provided with an encircling sleeve 3 or clamping bracket 3. In this embodiment example, the sleeve 3 is made from a steel material and is clamped around the outer bulb 12, so that it is non-positively connected with the outer bulb 12.

The base 2 is formed to have an annular shape, in this case a circular shape. It consists of a frame portion 21 to which a cover plate 22 is fastened, as shown in FIG. 3. The frame portion 21 is formed to have an essentially annular shape and has a rim 210 having an outwardly curved C-shaped cross section. On its upper surface facing the cover plate 22, a collar 211 angled towards the outside is integrally formed, and the collar 211 in its turn forms a right angle towards the cover plate 22.

The cover plate 22 is formed to have an essentially annular shape and has a rim 23 which runs around its outside perimeter and forms an essentially right angle towards the frame portion 21. The inside diameter of the encircling rim 32 essentially corresponds to the outside diameter of the angle of bend of the collar 211 of the frame portion 21 on which the rim 32 rests. Four spring tabs 24 are each integrally formed on the internal radius of the cover plate 22 and are each offset at an angle of 90° from one another and are bent through the circular opening of the cover plate 22 in the direction of the frame portion 21. These spring tabs 24 are formed in such a way that they are biased against the sleeve 3 fastened to the outer bulb 12 of the burner 1 when the latter is inserted. On the surface of the cover plate 22, three reference notches 25 disposed in relation to each other are provided. These reference notches 25 are used for adjusting the burner 1 within the base 2.

In the rim 210 of the base 2, recesses or holes 26 each located opposite an associated spring tab 24 are provided. Thus, the holes 26 are arranged on a straight line defined by the center point of the base and a point in the area of a spring tab which in the mounted condition rests against the sleeve 3 of the burner 1. These holes 26 allow the spring tabs 24 to be laser spot welded to the inserted sleeve 3, as will be explained below with the aid of FIG. 5.

Figure 4:
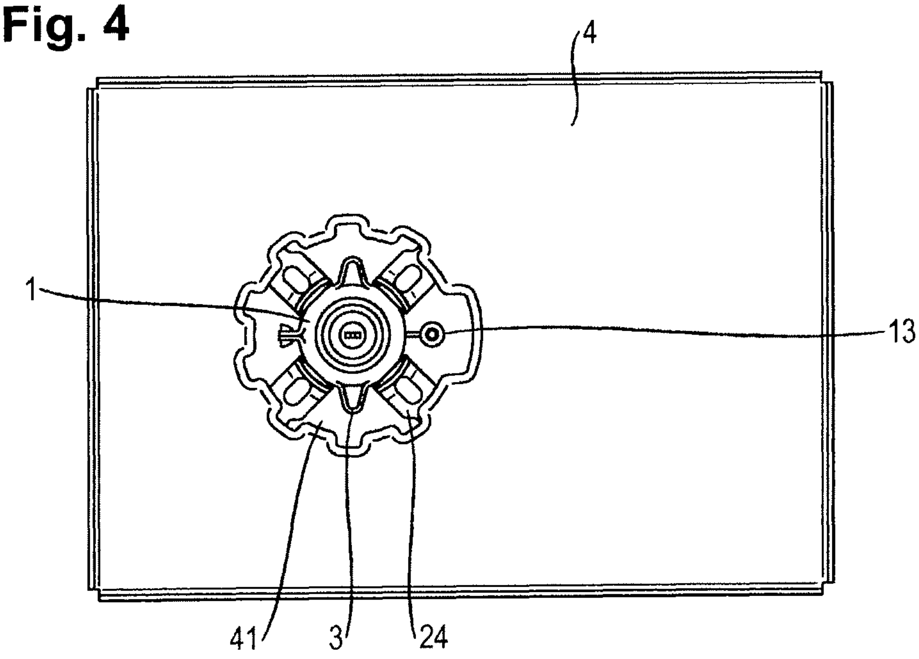
FIG. 4 shows the schematic diagram of the arrangement of the burner and the housing from FIG. 1 in a bottom view.

The housing includes an essentially circular opening, "cut" or cavity 41 which in the mounted condition of the base is aligned with the circular opening of the base 2, as shown in FIG. 4. In the mounted condition, the outer bulb 12 and the return wire 13 of the burner 1 protrude through the cavity 41 into the housing 4 of the electronis ballast unit. By means of this arrangement, the distance LCL between the surface of the base 2 and the center of the discharge vessel 11 is minimized (see FIG. 3).

Figure 5:
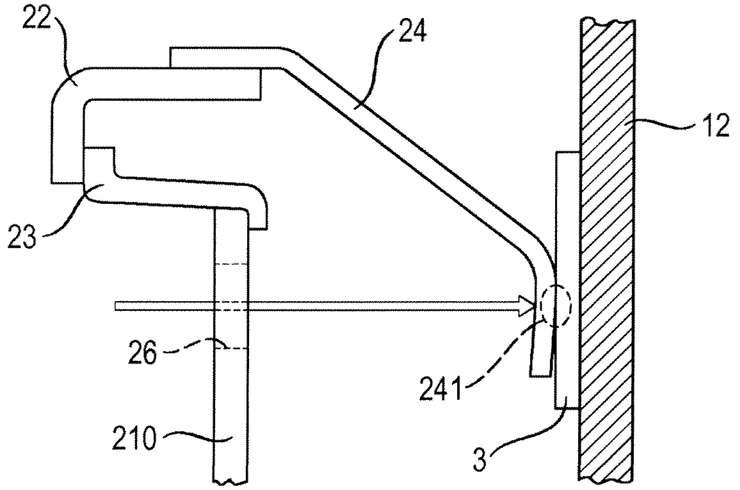
FIG. 5 is a schematic representation of a welding procedure in a first embodiment of the method according to the invention.

FIG. 5 shows a schematic representation of a welding procedure in a first embodiment of the method according to the invention to weld a spring tab 24 to the sleeve 3 of the burner 1. Here, the base 2 comprises a number of openings 26, one for each spring tab 24, wherein each opening 26 in the rim 210 is aligned with a fastening point 241 of the corresponding spring tab 24. A beam of laser light L is directed through a hole 26 onto the fastening point 241 to locally heat the material of the spring tab 24 and the material of the sleeve 3, causing the spring tab 24 to be welded to the sleeve 3 at that point.

Figure 6:
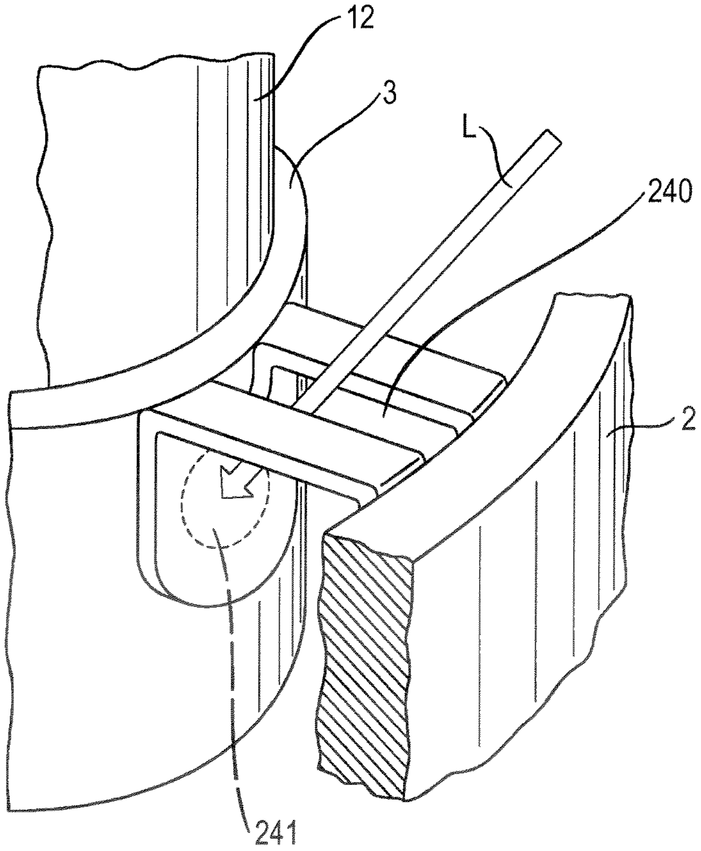
FIG. 6 is a schematic representation of a welding procedure in a second embodiment of the method according to the invention.

FIG. 6 shows a schematic representation of an alternative welding procedure according to a second method according to the invention. Here, the spring tabs 24 are realized to have tab openings 240, allowing easy laser access to the fastening points 241 from above. To weld the spring tabs 24 to the sleeve 3, the beam of laser light L can simply be directed from above at the fastening points 241 to weld the spring tabs 24 to the sleeve 3. The vertical and horizontal angles of the laser beam L, and therefore the size of the welded area, can be adjusted depending on the length and width of the tab opening 240.

LIST OF REFERENCE SIGNS

1 Burner
2 Base
3 Sleeve
4 Housing
11 Discharge vessel
12 Outer bulb
13 Return wire
21 Frame portion
210 Rim
211 Collar
22 Cover plate
23 Rim
24 Spring tab
25 Reference notch
26 Opening
41 Cavity
240 Tab opening
241 Fastening point
LCL Light Centre Length

The invention claimed is:

1. An apparatus for fastening a burner of a discharge lamp to a housing or plug portion, the apparatus comprising:
an annular base fastened to the housing or plug portion of an electronic ballast unit; and
tabs connected to the annular base, orientated in a direction of a center point of the annular base, inclined at an angle extending downward from the annular base through an opening of the annular base, and biased so that in a mounted condition of the burner, the tabs rest against a sleeve clamped around an outer bulb of the burner below a surface of the annular base, wherein at least one of the tabs, the annular base, and the sleeve define an opening therethrough aligned with a fastening point of the tab and the sleeve.

2. The apparatus as claimed in claim 1, wherein the annular base has a rim which extends around a perimeter of the annular base and in which recesses are provided each of which lie area straight line defined by the center point of the annular base and a point in the area of a tab, which in the mounted condition rests against sleeve.

3. The apparatus as claimed in claim 1, wherein at least one of the sleeve, the tabs, and the annular base are made from a steel material.

4. The discharge lamp as claimed in claim 1, wherein at least one of the tabs comprises a tab opening arranged at least in a region of the tab between the annular base and the sleeve.

5. A discharge lamp comprising:
a burner including an outer bulb;
a sleeve fastened around the outer bulb;
a housing or plug portion of an electronic ballast unit including an annular base with tabs integrally molded onto the annular base, the tabs orientated in a direction of a center point of the annular base, inclined at an angle extending downward from the annular base through an opening of the annular base, and spring-biased against the sleeve and resting against the sleeve below a surface of the annular base, wherein at least one of the tabs, the annular base, and the sleeve define an opening therethrough aligned with a fastening point of the tab and the sleeve.

6. The discharge lamp as claimed in claim 5, wherein the outer bulb of the burner is fastened to the housing of the electronic ballast unit and inside of the housing of the electronic ballast unit, is a high-voltage insulation layer.

7. A method of fastening a burner of a discharge lamp to a housing or plug portion of an electronic ballast unit, the method comprising acts of:
clamping a sleeve around an outer bulb of the burner;
fastening the burner in a base, which is fastened to the housing or plug portion, by tabs arranged on the base in a direction of a center point of the base, such that the tabs are inclined at an angle extending downward through an opening of the base and are biased against the sleeve so that, in the mounted condition of the burner, the tabs rest against the sleeve below a surface of the base; and
forming at least one of the tabs, the base, and the sleeve to define an opening therethrough aligned with a fastening point of the tab and the sleeve.

8. The method according to claim 7, comprising an act of directing a beam of laser light through the opening at a fastening point of at least one of the tabs to laser-weld the at least one of the tabs to the sleeve.

9. The method according to claim 8, wherein forming the opening comprises an act of forming at least one opening in a perimeter of the base, which opening lies on a straight line defined by the center point of the base and a point in the fastening point of a tab, the method comprising an act of
directing a beam of laser light through the opening at the fastening point of the tab to weld the tab to the sleeve.

10. The method according to claim 8, wherein forming the opening comprises an act of forming the opening in the at least one tab, the method comprising an act of
directing a beam of laser light through the opening at the fastening point of the tab to weld the tab to the sleeve.

11. A method of fastening a burner of a discharge lamp to a housing or plug portion of an electronic ballast unit, the method comprising acts of:
clamping a sleeve around an outer bulb of the burner;
fastening the burner in a base, which is fastened to the housing or plug portion, by tabs arranged on the base in a direction of a center point of the base, such that the tabs are inclined at an angle extending downward through an opening of the base and are biased against the sleeve so that, in the mounted condition of the burner, the tabs rest against the sleeve below a surface of the base;
forming a tab opening in a region of the tab between the base and the sleeve; and
directing a beam of laser light from above the base through the tab opening at the fastening point of the tab to weld the tab to the sleeve.

* * * * *